Figure 4:
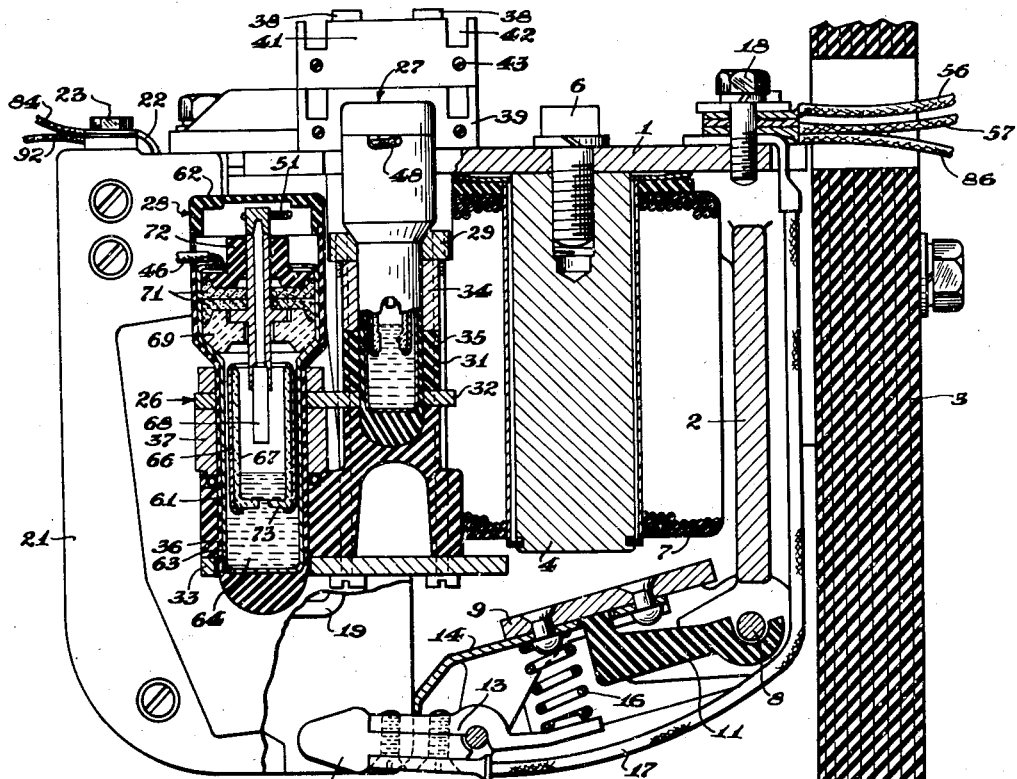

May 31, 1949.  J. D. RUSSELL ET AL  2,472,048
ELECTRIC CIRCUIT CONTROLLER
Filed Nov. 1, 1943  3 Sheets-Sheet 1
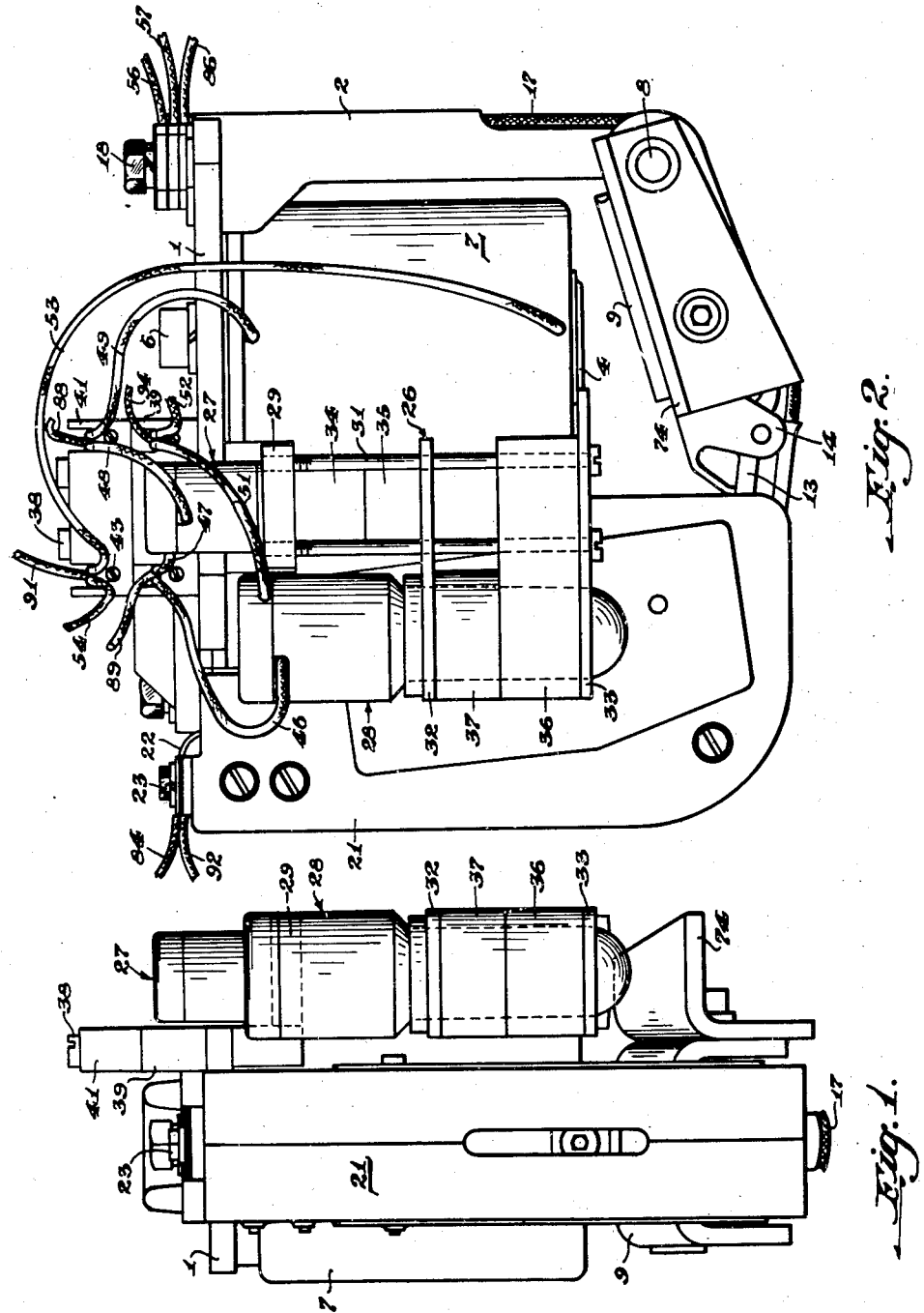
WITNESSES.
E. J. Maloney.
V. A. Peckham.
INVENTORS
John D. Russell
James W. Woolf
BY Brown, Critchlow & Flick
ATTORNEYS.

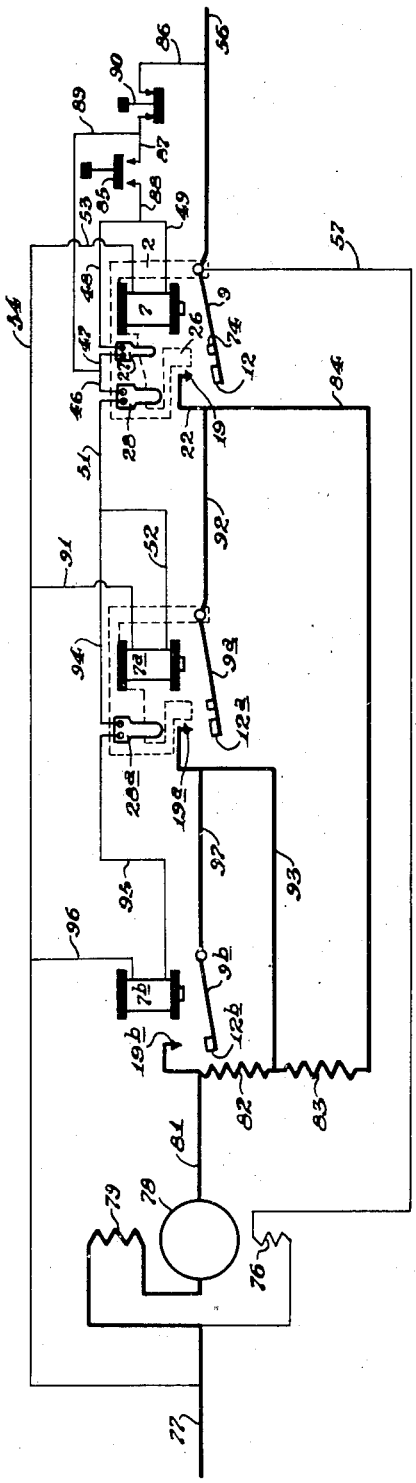
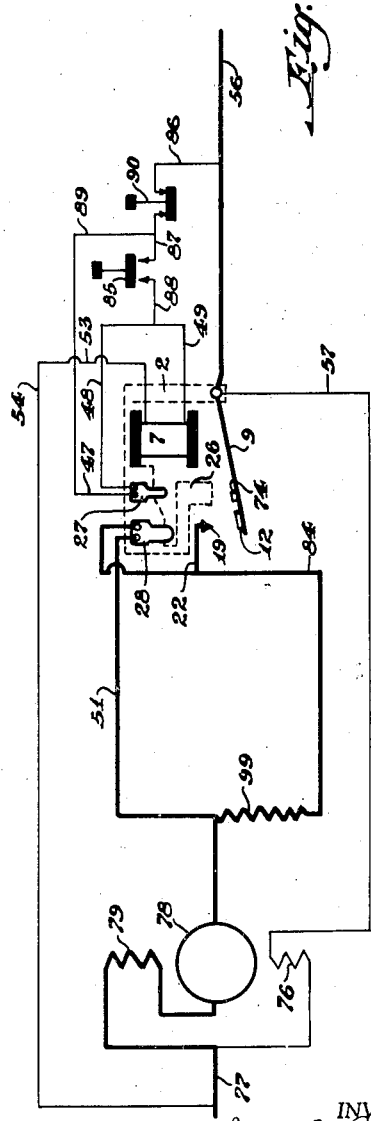

Patented May 31, 1949

2,472,048

UNITED STATES PATENT OFFICE 2,472,048

ELECTRIC CIRCUIT CONTROLLER

John D. Russell and James W. Woolf, Franklin, Pa., assignors to Joy Manufacturing Company, Franklin, Pa., a corporation of Pennsylvania Application November 1, 1943, Serial No. 508,472

14 Claims. (Cl. 318—403)

This invention relates to electric circuit controllers, and more particularly to a controller in which an auxiliary switch is magnetically actuated upon operation of a main switch.

This invention is especially applicable to electric contactors for starting electric motors where the full current load can not be applied to a motor at the outset. In such a case, electric resistance in the motor circuit at the start is shunted out as soon as the motor has started. One type of starting apparatus, or electric contactor, known heretofore comprises an electromagnet which is energized when a manual control switch is closed. The electromagnet attracts an armature that closes a main switch in the motor circuit in which one or more resistance elements are located, whereupon the motor is set in operation. The movement of the armature toward the magnet is also used to close, through mechanical connections, relay contacts in a control circuit which contains another electromagnet that operates a time delay switch. This switch may shunt out the resistance in the motor circuit, or it may be used to operate another electric contactor which will cut out some or all of the resistance. The number of contactors used depends upon the number of resistance elements in the motor circuit that are to be progressively shunted to bring the motor up to full speed. The objections to such apparatus for starting a motor include the expense due to the relay contacts and the auxiliary electromagnets for the auxiliary switches, and the occasional failure of the relay contacts to engage each other. This last objection is of major importance when the apparatus is used where there is a lot of dust or dirt in the air, or when the surrounding atmosphere itself is detrimental, such as with electrically operated shuttle cars and loaders in coal mines.

It is among the objects of this invention to provide an electric circuit controller of the type discussed above in which the operation of the auxiliary switch or switches is not affected by the surrounding atmosphere or the dust and dirt in it, in which exposed relay contacts and auxiliary electromagnets are eliminated, and which is a more compact and more dependable device than those known before.

In accordance with this invention a magnetic auxiliary switch is mounted adjacent an electromagnet which operates a main switch. The magnetic switch is located in a position where it is actuated by the magnetic flux of the magnet upon operation of the main switch. More specifically, the magnetic switch is mounted outside the normal path of the effective magnetic flux of the electromagnet, but means are provided which are effective upon operation of the main switch to direct enough of the magnetic flux through a secondary flux path to the magnetic switch to actuate it. The construction is such that the magnetic switch will not operate until the main switch has been operated. Each of the switches may be either normally open or normally closed. In the embodiment illustrated herein, the electromagnet is supported by a frame to which an armature is hinged for attraction by the magnet to a closed position. The frame forms a primary magnetic flux path. The main switch has one of its contacts operably connected to the armature so that the switch is actuated when the armature moves to closed position. The magnetic switch, which is operable by magnetic flux of predetermined magnitude, is supported by the frame outside the primary flux path in such a way as to form a normally incomplete and ineffective secondary flux path. When the armature moves to closed position it moves additional magnetic metal into the secondary flux path so that the path will be made more complete in order that enough flux will be directed along it to operate the magnetic switch.

Figure 3:
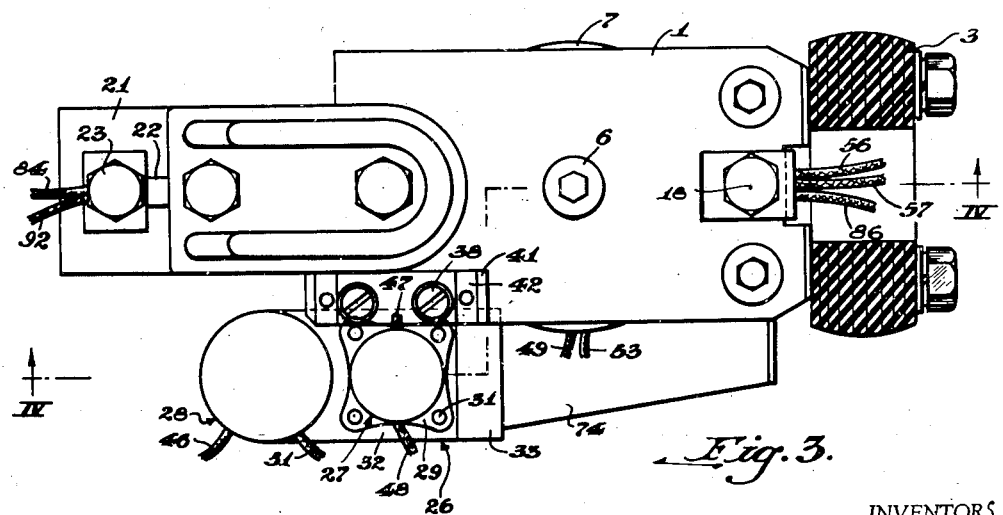

The invention is illustrated in the accompanying drawings in which Fig. 1 is an end view of our controller; Fig. 2 is a side view thereof; Fig. 3 is a plan view; Fig. 4 is a vertical section taken on the line IV—IV of Fig. 3; Fig. 5 is a circuit diagram showing how the controller is used in a motor starting circuit; and Fig. 6 is a modified circuit diagram.

Referring to the drawings, a metal frame is formed from a top plate 1 from one end of which a leg 2 extends downwardly. This leg is adapted to be bolted to a suitable insulating support 3 for the controller, as shown in Figs. 3 and 4. Suspended from the central portion of the top plate is an electromagnet that includes a core or pole piece 4 attached to the bottom of the plate by a screw 6. The pole piece is encircled by a solenoid coil 7. Hinged to the lower end of the frame leg by a horizontal pivot pin 8 is an armature 9 which has a flat top portion below the pole piece, and downwardly extending side portions. Gravity normally swings the armature down away from the coil, but this movement is limited by a non-magnetic stop member 11 attached to the frame.

Projecting from the free end of the armature by which it is carried, is one contact 12 (Fig. 4) of a main switch. This contact is mounted on one end of a lever 13 that is pivoted on a horizontal axis in a bracket 14 rigidly attached to the bottom of the armature. The other end of the lever is pushed downwardly by a coil spring 16 compressed between it and the bracket above. The contact is connected by a flexible conductor 17 and a terminal screw 18 to the top plate of the frame. The other contact 19 of the main switch is rigidly mounted inside of a hollow insulating block 21 suspended from the end of the top plate opposite to leg 2. This fixed contact is connected by an electrical conductor 22 to a terminal screw 23 on top of the block. The usual arc blow-out coil (not shown) may be located in the block in the circuit between contact 19 and terminal 23. The side of the block facing the armature is provided with a vertical slot to accommodate bracket 14 and contact 12. When the armature is drawn up toward the magnet, the armature raises switch contact 12 into engagement with the fixed contact 19, thereby closing the main switch.

It is a feature of this invention that when armature 9 is moved to closed position to close the main switch, one or more auxiliary switches are operated without the use of relay contacts and additional electromagnets. In the embodiment disclosed in the drawings, two auxiliary switches are used, one being smaller than the other. The small one is a holding switch and the large one a time delay switch. These are supported by a bracket 26 suspended from the top plate of the frame beside insulating block 21. This bracket may take different forms, the one shown being satisfactory and permitting easy insertion and removal of the switches 27 and 28 that preferably are tubular magnetic mercury switches of a well-known type. The upper end of bracket 26, which is bolted to the bottom of the top plate, has an integral lateral rectangular projection 29 provided centrally with a circular opening extending vertically through it for receiving the small switch 27. The corners of this projection are provided with threaded vertical openings in which the upper ends of four long, non-magnetic screws 31 are screwed. These screws pass through one end of a horizontal center plate 32, and also through one end of a horizontal bottom plate 33 that rests on the screw heads. These two plates and the upper end of the bracket with its rectangular projection are all made of magnetic metal. The center plate is spaced from projection 29 by a metal ring 34 and an insulating ring 35 encircling switch 27, and the bottom and center plates are spaced apart by a block 36 of insulating material that rests on the bottom plate and has an upwardly projecting extension at one end engaging the center plate. The top of this extension is provided with a recess below an opening through the center plate for accommodating the lower end of switch 27. The other end of block 36 is spaced from the center plate by a metal ring 37. Rings 34 and 37 are made of magnetic metal. The center plate, insulating block 36, and bottom plate are provided with circular openings in axial alignment with the passage through the ring for receiving large switch 28.

The screws 38, that connect bracket 26 to the frame, hold in place on top of plate 1 a pair of superimposed electrical connectors 39 and 41 made of insulating material. Each of these connectors is provided with a pair of transverse slots 42 having vertical openings in their lower walls extending down to the inner ends of threaded horizontal openings in the connectors. These horizontal openings receive screws 43 (Figs. 2 and 4) which press together the ends of wires inserted in the vertical openings and anchor the wires therein. Two wires 46 and 47 from the switch tubes are connected together in this manner at one end of connector 39, and the other wire 48 of the small switch is connected to a wire 49, from the top of the coil, at the other end of connector 41. The other wire 51 of the large switch is joined in connector 39 to a wire 52 leading to any device that the switch is to control, and the remaining wire 53 of the solenoid coil is connected in connector 41 to a wire 54 leading to a source of electric power. All of these wires are in the auxiliary or control circuit, the main circuit leads 56 and 57 being connected to terminal screws 18 and 23, respectively.

Referring now to switches 27 and 28 in Fig. 4, each has a tubular body 61 of molded insulating material the enlarged upper end of which is closed by an insulating cap 62. Snugly fitting in the body is a metal liner 63 closed at its lower end and forming one of the electrical conductors of the switch. In the large switch, wire 46 is connected to the upper end of the liner, while in the small switch, wire 48 is joined to its liner. The lower portion of each liner contains a body of mercury 64 that forms one electrode of the switch and on which floats an actuating member or displacer formed by a magnetic metal sleeve 66 provided with a ceramic lining 67 to give it the desired buoyancy for its wall thickness. Extending down into the displacer is the other electrode 68 of the switch with its lower end normally spaced from the mercury below it. This electrode is supported by a ceramic washer 69 above which sealing gaskets 71 are held in place by a compression insulator 72. The upper end of electrode 68 in the large switch is connected to wire 51, while the same electrode in the small switch is connected to wire 47.

When the floating displacer is moved down in the mercury to the bottom of metal liner 63, the mercury displaced by it rises around and inside of the displacer until it surrounds the lower end of the center electrode 68, thereby completing a circuit through the switch. The mercury in the small switch rises in its displacer as fast as the displacer moves downwardly, so that switch is closed immediately. However, in the other switch the lower end of ceramic lining 67 is provided with a bottom wall 73 in the center of which there is a small opening. This restriction prevents the rapid rise of mercury inside the displacer. Consequently, when the displacer moves to its lower position, the mercury first rises around it and then settles down as the mercury rises through the restricted opening in the lower end of the displacer. The result is that this switch is not closed until a moment or two after the displacer moves down, thereby giving a time delay.

Magnetic flux emanating from coil 7 is depended upon for drawing the displacers of switches 27 and 28 downwardly to cause the mercury electrodes to rise and close the switches. To make this possible, it will be observed that the construction of bracket 26, previously described, is such that there is a body of metal surrounding the displacer of each switch in its normal or upper position, while there is very little metal adjacent the lower ends of the switches. Consequently, if sufficient magnetic flux is directed in a secondary path from the coil to the lower ends of the switches, the displacers will attempt to reduce the reluctance of the path by moving downwardly toward the location in which there is less surrounding metal. However, as there is no break in the metal path from the pole piece 4 of the magnet through the top plate and down through the end leg of the frame to the armature, this metal path forms the main flux path for the magnetic flux of the magnet so that normally the broken secondary path does not receive enough flux to operate switches 27 and 28. In order to increase the flux in the secondary path to the extent necessary to draw the displacers down in the switches, a bracket-like bar 74 of magnetic metal is fastened to the side of the armature in such a position that when the armature is swung upwardly to closed position, this bar engages the projecting end of lower plate 33 of bracket 26. This introduces additional magnetic metal into the secondary flux path and completes the metal path between the armature and bottom of the bracket. The result is an increase in the magnetic flux in the secondary path to such an extent that the displacers in the magnetic switches are drawn downwardly and the switches thus closed. As this does not occur until bar 74 strikes bracket 26, the auxiliary switches can not operate until contacts 12 and 19 of the main switch have closed. In addition to eliminating the expense of relays and auxiliary electromagnets, this apparatus also avoids the failure of the auxiliary switches to operate due to dirt getting between exposed relay contacts. Another advantage is that the magnetic attraction of bracket 26 and bar 74 for each other aids in closing the armature and in holding it closed against gravity and the resistance of spring 16. In electric contactors known heretofore the relays that have been mechanically connected to the armature resist its closing and tend to pull it open.

One way in which this controller can be used in a motor starting circuit is illustrated in Fig. 5. The most important parts of the controller are shown diagrammatically at the right hand end of the circuit where they are identified by the same numbers used in Figs. 1 to 4. A suitable source of electric power is connected by main conductor 56 to armature 9 and main switch contact 12 carried by it. Frame 2 and bracket 26 are indicated by broken lines to avoid confusion with the solid lines representing wires. Conductor 56 is also connected by a wire 57 to the shunt field 76 of an electric motor. The other end of the field is connected by a main conductor 77 to the source of power. Connected in series between line 77 and the motor armature 78 is the series field 79 of the motor. The armature is also connected by a wire 81, a pair of electric resistance elements 82 and 83, and a wire 84 to wire 22 connected to contact 19 of the main switch. When the main switch in the controller is closed, a circuit will be completed through wires 56, 22, and 84, resistances 83 and 82, wire 81, the motor armature and field coil 79, and wire 77. The motor will therefore start at reduced speed because of the presence of the two resistance elements in the starting circuit.

To close the main switch of the controller, a manually operable push button switch 85, in a line formed by wires 86, 87, and 88 connecting lead 56 to wires 48 and 49, is first closed. This completes a circuit through solenoid coil 7 which is connected by wires 53 and 54 to lead 77, so the armature is drawn up and the main switch is closed. Release of push button 85 will permit that switch to open, so to hold the circuit through the coil a wire 89 is connected to wire 87 between the push button 85 and lead 56, and also to wires 46 and 47 connecting magnetic switches 27 and 28. When the armature closes, it causes bar 74 to make contact with switch-supporting bracket 26, whereupon the magnetic flux in the secondary path causes both magnetic switches to close. Closing of small switch 27 completes a circuit around push button 85 so that the circuit through the solenoid is held after the push button is released. This circuit is not broken until a normally closed push button switch 90, in line 86—87, is opened.

Closing of time delay switch 28, which requires a short interval of time to occur, completes a circuit from wire 46 through wires 51 and 52 to an electromagnet 7a that is connected by a wire 91 to line 54. This electromagnet is part of an electric controller or contactor which is the same as the one described above except that it does not include a magnetic holding switch. When the magnet is energized, it attracts an armature 9a that is connected by a wire 92 to conductor 22. The armature moves a main switch contact 12a against another contact 19a connected by a wire 93 to the adjacent ends of resistance elements 82 and 83. This shunts out resistance 83 with a resulting increase in speed of the motor. At the same time, closing of armature 9a completes the secondary flux path through time delay switch 28a which therefore closes a moment later. This switch is connected by a wire 94 to wires 51 and 52, and by a wire 95 to an electromagnet 7b which is connected by a wire 96 to line 54.

The energized magnet attracts an armature 9b connected by a wire 97 to wire 93, and the armature swings a main switch contact 12b against a fixed contact 19b which is connected to wire 81. This completes a circuit from main line 56 straight through the three main switches to the motor armature, and thereby cuts out resistance 82 so that the motor can run at full speed. If there had been more resistance elements in the circuit initially, then more electric contacts would be required in order to progressively shunt all of the resistors.

In case only one resistor is in the starting circuit, a simplified circuit can be used such as shown in Fig. 6. In this arrangement the time delay switch 28 carries the main load instead of merely being located in a control circuit. Thus, wire 46 from the time delay switch is not connected to 19, and wire 51 is connected directly to the motor the holding switch, but to main switch contact armature. A resistance element 99 is shunted across wires 51 and 84 and is therefore in the motor circuit when the main switch of the controller is first closed. However, as soon as the time delay switch has had time to close, the main circuit is from switch contact 19 through wire 46, switch 28 and wire 51 to the motor, thereby shunting out the resistor.

In the embodiment of the invention disclosed herein all of the controller switches are normally open, but it will be obvious that the features of the invention are applicable in cases where any one or more of the switches are normally closed. The magnetic flux in the secondary flux path of the controller can be used to open normally closed switches, just as well as to close switches, by locating the magnetic gaps in bracket 26 at the upper ends of normally lowered displacers in the switch tubes.

According to the provisions of the patent statutes, we have explained the principle and mode of operation of this invention and have illustrated and described what we now consider to represent its best embodiment. However, we desire to have it understood that, within the scope of the appended claims, the invention may be practiced otherwise than as specifically illustrated and described.

We claim:

1. In a magnetic circuit, the combination of a fixed magnetic core, a coil mounted on the core, magnetic means connected to one end of the core and providing a plurality of parallel magnetic paths each extending around the coil toward the exposed end of the core to perform independent magnetic functions, means defining a socket in one of said magnetic paths, means defining a fixed gap in said magnetic path within the socket, an enclosed magnetically operable mercury switch stepped in the socket, an armature mounted to be attracted to the exposed end of the core through one of said magnetic paths when the coil is energized and biased to move away when the coil is de-energized, and magnetic means carried by the armature for closing said magnetic paths to the exposed end of the core when the coil is energized and the armature is attracted to the core for operating said mercury switch.

2. In a magnetic circuit, the combination of a fixed magnetic core, a coil mounted on the core, magnetic means connected to one end of the core and providing a plurality of parallel magnetic paths each extending around the coil toward the exposed end of the core to perform independent magnetic functions, means defining a fixed gap in one of said magnetic paths, a magnetic part interposed in said gap, means defining a socket on each side of the magnetic part, an enclosed magnetically operable mercury switch stepped in each socket to place said switches in series in said gap and arranged to be operated by the flux across the gap, an armature mounted to be attracted to the exposed end of the core through one of said magnetic paths when the coil is energized and biased to move away when the coil is de-energized, and magnetic means carried by the armature for closing said magnetic paths to the exposed end of the core when the coil is energized and the armature is attracted to the core for operating said mercury switches.

3. In an electric circuit controller, the combination of an electromagnet consisting of a coil mounted on a core with a return magnetic path to an armature arranged to be attracted to the core when the coil is energized and biased to move away when the coil is de-energized, magnetic means connected to one end of the core and providing a second magnetic path extending around the coil toward the other end of the core, said second magnetic path having a fixed gap intermediate of its ends, an enclosed magnetically operable mercury switch operated by the flux across the gap, switch means connected to initially energize the coil, magnetic means carried by the armature for closing the magnetic path to the other end of the core when the coil is energized and the armature is attracted to the core for operating said mercury switch, a holding circuit to said coil closed by the mercury switch to bridge the switch means, and other switch means to break the holding circuit.

4. In an electric circuit controller, the combination of an electromagnet consisting of a coil mounted on a core with a return magnetic path to an armature arranged to be attracted to the core when the coil is energized and biased to move away when the coil is de-energized, magnetic means connected to one end of the core and providing a second magnetic path extending around the coil toward the other end of the core, said second magnetic path having a fixed gap intermediate of its ends, a magnetic part interposed in said gap, an enclosed magnetically operable mercury switch on each side of said part and operated by the flux across the gap, switch means connected to initially energize the coil, magnetic means carried by the armature for closing the magnetic path to the other end of the core when the coil is energized and the armature is attracted to the core for operating said mercury switches, a holding circuit to said coil closed by one of said mercury switches to bridge the switch means, a second electromagnet having an energizing circuit closed by the operation of the other mercury switch, and other switch means to break the holding circuit.

5. The structure of claim 4 characterized in that said second electromagnet is similar to said first electromagnet and having magnetic means providing a magnetic path with a gap, and a mercury switch actuated by the flux across said last mentioned gap and connected to energize a third electromagnet.

6. In a series motor circuit having a resistance in series, the combination of an electric circuit controller consisting of a coil mounted on a core with a return magnetic path to an armature arranged to be attracted to the core when the coil is energized and biased to move away when the coil is de-energized, magnetic means connected to one end of the core and providing a second magnetic path extending around the coil toward the other end of the core, said second magnetic path having a fixed gap intermediate of its ends, a magnetic part interposed in said gap, an enclosed magnetically operable mercury switch on each side of said part and operated by the flux across the gap, switch means connected to initially energize the coil, magnetic means carried by the armature for closing the magnetic path to the other end of the core when the coil is energized and the armature is attracted to the core for operating said mercury switches, a holding circuit to said coil closed by one of said mercury switches to bridge the switch means, a contact carried by the armature and connected for supplying current to the series motor circuit, a circuit closed by the other mercury switch to shunt the series resistance of the motor circuit, and means causing a time delay in the operation of said other mercury switch.

7. In a magnetic circuit, the combination of a fixed magnetic core, a coil mounted on the core, magnetic means connected to one end of the core and providinng a plurality of parallel magnetic paths, each extending around the coil toward the exposed end of the core to perform independent magnetic functions, an armature mounted to be attracted to the exposed end of the core through one of said magnetic paths when the coil is energized and biased to move away when the coil is deenergized, means defining a fixed gap in another of said magnetic paths, magnetic means carried by the armature for closing said magnetic paths to the exposed end of the core when the coil is energized and the armature is attracted to the core and causing flux to flow through each magnetic path, and a plurality of magnetic field responsive means positioned adjacent the fixed gap to be actuated by the flux across said fixed gap when the armature is attracted to the core.

8. In a magnetic circuit, the combination of a fixed magnetic core, a coil mounted on the core, magnetic means connected to one end of the core and providing a plurality of parallel magnetic paths, each extending around the coil toward the exposed end of the core to perform independent magnetic functions, an armature mounted to be attracted to the exposed end of the core through one of said magnetic paths when the coil is energized and biased to move away when the coil is deenergized, means defining a fixed gap in another of said magnetic paths, magnetic means carried by the armature for closing said magnetic paths to the exposed end of the core when the coil is energized and the armature is attracted to the core and causing flux to flow through each magnetic path, and a plurality of magnetic field responsive means positioned in series and adjacent the gap to be actuated by the flux across said gap when the armature is attracted to the core.

9. In a magnetic circuit, the combination of a fixed magnetic core, a coil mounted on the core, magnetic means connected to one end of the core and providing a pair of parallel magnetic paths each extending around the coil toward the exposed end of the core to perform independent magnetic functions, an armature mounted to be attracted to the exposed end of the core through one of said magnetic paths when the coil is energized and biased to move away when the coil is deenergized, and magnetically actuated means in the other of said magnetic paths, said armature connecting said other magnetic path to the exposed end of the core when the coil is energized and the armature is attracted to the core to cause flux to flow through said other magnetic path and operate said magnetically actuated means.

10. The structure of claim 9, characterized in that said coil extends substantially the full length of the core portion of the magnetic path.

11. The structure of claim 9, characterized in that said other magnetic path has means defining a gap, said magnetically actuated means is positioned relative to said gap and is actuated by the flux across said gap after the means carried by the armature closes the magnetic paths to the exposed end of the core.

12. The structure of claim 9, characterized in that said other magnetic path has means defining a gap located intermediate the ends of the core, said magnetically actuated means is positioned relative to said gap and is actuated by the flux across said gap after the means carried by the armature closes the magnetic paths to the exposed end of the core.

13. The structure of claim 9, characterized in that said other magnetic path has means defining a gap, a magnetic part interposed in said gap, said magnetically actuated means consisting of two independent structures disposed on the opposite sides of said magnetic part and actuated by the flux across said gap after the means carried by the armature closes the magnetic paths to the exposed end of the core.

14. The structure of claim 9, characterized in that said other magnetic path has means defining a gap located intermediate the ends of the core, a magnetic part interposed in said gap, said magnetically actuated means consisting of two independent structures disposed on the opposite sides of said magnetic part and actuated by the flux across said gap after the means carried by the armature closes the magnetic paths to the exposed end of the core.

JOHN D. RUSSELL.
JAMES W. WOOLF.

REFERENCES CITED

The following references are of record in the file of this patent:

UNITED STATES PATENTS

| Number | Name | Date |
|---|---|---|
| 892,749 | Le Brocq | July 7, 1908 |
| 925,495 | McInnerney | June 22, 1909 |
| 960,505 | Cheney | June 7, 1910 |
| 968,208 | Town | Aug. 23, 1910 |
| 1,194,132 | Brown | Aug. 8, 1916 |
| 1,727,872 | Evans | Sept. 10, 1929 |
| 1,845,227 | Bower | Feb. 16, 1932 |
| 1,994,925 | Schaelchlin | Mar. 19, 1935 |
| 2,124,410 | Cockrell | July 19, 1938 |
| 2,247,493 | Harrison et al. | July 1, 1941 |
| 2,307,304 | Rudd | Jan. 5, 1943 |
| 2,375,229 | Klemperer | May 8, 1945 |

FOREIGN PATENTS

| Number | Country | Date |
|---|---|---|
| 342,143 | Germany | Oct. 13, 1921 |
| 322,603 | Great Britain | Dec. 12, 1929 |

Certificate of Correction

May 31, 1949

Patent No. 2,472,048

JOHN D. RUSSELL ET AL.

It is hereby certified that errors appear in the printed specification of the above numbered patent requiring correction as follows:

Column 1, line 7, for "loal" read *load*; column 6, line 53, strike out "19, and wire 51 is connected directly to the motor" and insert the same in line 54, after "contact"; column 8, line 59, for "providinng" read *providing*;

and that the said Letters Patent should be read with these corrections therein that the same may conform to the record of the case in the Patent Office.

Signed and sealed this 3rd day of January, A. D. 1950.

[SEAL]

THOMAS F. MURPHY,
*Assistant Commissioner of Patents.*